US006546082B1

United States Patent
Alcendor et al.

(10) Patent No.: US 6,546,082 B1
(45) Date of Patent: Apr. 8, 2003

(54) METHOD AND APPARATUS FOR ASSISTING SPEECH AND HEARING IMPAIRED SUBSCRIBERS USING THE TELEPHONE AND CENTRAL OFFICE

(75) Inventors: Tommy R. Alcendor, Boynton Beach, FL (US); Vicki L. Colson, Deerfield Beach, FL (US); Baiju D. Mandalia, Boco Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/563,603

(22) Filed: May 2, 2000

(51) Int. Cl.$^7$ ............................................... H04M 11/00
(52) U.S. Cl. ..................... 379/52; 379/93.17; 379/88.12
(58) Field of Search ................................. 379/52, 88.12, 379/90.01, 92.02, 92.03, 93.15, 93.17, 93.18, 93.24, 100.06; 370/352

(56) References Cited

U.S. PATENT DOCUMENTS

| 4,659,877 A | | 4/1987 | Dorsey et al. | |
|---|---|---|---|---|
| 5,559,856 A | * | 9/1996 | Dowens | 379/52 |
| 5,574,776 A | * | 11/1996 | Leuca et al. | 379/52 |
| 5,710,806 A | | 1/1998 | Lee et al. | |
| 5,832,433 A | | 11/1998 | Yashchin et al. | |
| 5,991,723 A | * | 11/1999 | Duffin | 379/52 |
| 6,078,650 A | * | 6/2000 | Hansen | 379/52 |

OTHER PUBLICATIONS

Taskett; Method and Apparaus for providing . . . for the hearing impaired; Feb. 13, 1997; WO 97/05732.*

* cited by examiner

Primary Examiner—Melur Ramakrishnaiah

(57) ABSTRACT

A system and method for Assisting Speech And Hearing-impaired Subscribers Using The Telephone And Central Office is disclosed. The present invention in some preferred embodiments permits remote customization of Central Office resources on behalf of a specific subscriber, and also allows the subscriber to test the customization before deployment. The present invention helps advance the art of telephony voice assistance by adding mechanisms to solve problems present in standalone environments. The method on the system comprises the steps of: receiving a communication session request from a first party using a first user unit; and determining if the first party is speech-impaired, and if the first party is speech-impaired, then performing the sub-steps of: prompting the first party for text input; receiving the text input from the first party; converting the text input, using a Text-to-Speech resource, to an audio output; and sending the audio output to a second party.

18 Claims, 6 Drawing Sheets

METHOD AND APPARATUS FOR ASSISTING SPEECH AND HEARING IMPAIRED SUBSCRIBERS USING THE TELEPHONE AND CENTRAL OFFICE

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

This invention generally relates to the field of telephony services and more particularly to the field of telephony speech recognition services and telephony speech services synthesis over a communications network.

BACKGROUND OF THE INVENTION

The use of telephone over PSTN (public switch telephone network) continues to grow at a tremendous rate. Recently, the use of the Internet and voice over IP has been gaining popularity as well.

The use of the telephone although easy for most people can be problematic for individuals with diminished hearing or speech capabilities. It is common for individuals who have diminished hearing or speech capabilities to feel discouraged when having to use the telephone. Special devices to improve the quality of participation for speech impaired individuals in a telephony conversation are widely available. One example of a device is a simple amplifier for amplifying the volume of the receiver's handset. This solution works well for many hearing impaired individuals; however, the use of a simple amplifier will not work for many other impaired individuals.

A system is disclosed in U.S. Pat. No. 5,832,433, with inventors Yashchin, et al., entitled "Speech synthesis method for operator assistance telecommunications calls comprising a plurality of text-to-speech (TTS) devices" describes a method and apparatus for providing automated operator services and in particular, a reverse directory assistance service. A calling customer is connected to an automated system that prompts the caller for a listing identifier which is used by the system to retrieve a textual listing corresponding to the listing identifier from a database of textual listings. The textual listing contains a TTS ID, which identifies a particular one TTS device from a plurality of TTS devices and the listing is optionally preprocessed and parsed into a plurality of fields that define the listing. The listing text is then sent to the particular one TTS device for text to speech synthesis of the text contained within the listing. The method further includes teaching the system which one TTS device of the plurality of TTS devices, best synthesizes the text contained within the listing and then identifying that one TTS device within the listing so that subsequent synthesis will utilize that TTS device.

Another system is disclosed in U.S. Pat. No. 4,659,877, with inventors Eric. A. Dorsey et al., entitled "Verbal computer terminal system" for a telephonic data communications system provides verbal communication of data in remote computer systems. The major components of the systems are a plurality of channels and a data processor. Each channel includes a text-to-speech translator for translating digitally stored textual data into analogue speech signals corresponding to the verbal expression of the textual data; a telephone interface for establishing a telephonic connection with a caller; and an RS232 port for accessing a data base in a remote host computer system. The data processor includes software for controlling the communications protocols used by each channel, whereby each channel emulates a computer terminal suitable for communication with the remote computer system connected to that channel, and software for extracting selected data from the data received from the remote computer system. This system enables one to telephonically receive data from a remote computer without the need for a computer terminal and without needing to reprogram the remote computer to communicate with the telephonic data communication system.

Yet another system is disclosed in U.S. Pat. No. 5,710,806, with inventors Peter Lee et al., entitled "Telecommunications device for the hearing impaired with telephone, text communication and answering, and automated voice carryover" for a telecommunication device for the hearing impaired having the capability of sending text communications via a telephone-style keypad and receiving text communications for display on an LCD display in addition to providing standard telephone voice communications. The telecommunications device automates voice carryover (VCO) calls and provides automatic answering and recording capability for text messages on the same telephone line as a voice answering machine and or a facsimile machine. The telecommunications device further includes means for selectively adjusting the amplification of received voice messages and sent voice messages to provide maximum amplification of said received voice messages without producing feedback oscillation or to provide maximum amplification of sent voice messages without producing feedback oscillation. The telecommunications device further including means for minimizing effect of the reflected impedance of the telephone line on signal transmission and optimizing the coupling of signals to the telephone line.

All these systems, although useful, are not without their shortcomings. To begin, all of these systems require that the user buy custom equipment, such as Teletype terminals and other specialty terminal devices. The expense of the required end-user telecommunication devices could be prohibitive. Accordingly, a need exists for a method and apparatus to provide individuals, who have diminished hearing or speech capabilities, with the ability to communicate, via telephone, without the need to purchase specialty terminal devices.

In other words, currently, telephony voice assistance devices require specialized hardware and software at the end user's location, restricting user access to that particular location. Moreover, provisions for customizing voice assistance resources in standalone environments are normally not provided, and the standard synthesized voice model used to speak text is unable to express gender, accenting, or modify the rate at which text is spoken. The user is left with an inflexible, costly, restrictive facility that requires maintenance and replacement.

Another shortcoming with system available today is the lack of Internet support. The convergence of telephone over the Internet in telephony IP continues to grow. The use of Web-based services continues to grow such as those available by DialPad.com. Moreover, many of the web-based services are lower cost or even free to consumers. However, none of these new services address the needs for individuals who have diminished hearing or speech capabilities over the Internet. Accordingly, a need exists to provide services to overcome the aforementioned problems.

SUMMARY OF THE INVENTION

With recent advancements in computing and telephony technology, there is a new method for individuals who are hearing or speech impaired to participate in telephony conversations. Devices for speech and hearing impaired individuals to communicate via the telephone do exist; however, they do not utilize a Central Office service. This invention provides that service. Using a computer and subscribing to a Central Office (CO) service, hearing or speech impaired individuals can allocate and use Central Office Text-To-Speech (TTS) and Speech Recognition (SRECO) resources to communicate, on their behalf.

Accordingly, there is provided a system and method for individuals who are hearing or speech impaired to participate in telephony conversations. The major components of the system include a text-to-speech (TTS) translator, a speech recognition server (SRECO), a telephonic interface, a Central Office, a Voice Response Unit (VRU), a Subscriber Database (VASDB), a data base access interface, a Client Application (ClientApp), a Web Server interface, and an ISCP (Integrated Service Control Point) of an AIN (Advanced Intelligent Network) for controlling and coordinating the other parts.

According to one embodiment of the present invention, a method for communications in a network that includes a Central Office and an Advance Intelligent Network system, wherein the Central Office is coupled to a plurality of user units is disclosed. The method on the Advance Intelligent Network system comprising the steps of: receiving a communication session request from a first party using a first user unit; and determining if the first party is speech impaired, and if the first party is speech impaired, then performing the sub-steps of: prompting the first party for text input; receiving the text input from the first party; converting the text input, using a Text-to-Speech resource, to an audio output; and sending the audio output to a second party.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be apparent from the following detailed description taken in conjunction with the accompanying drawings. For a fuller understanding of the advantages provided by the invention, reference should be made to the following detailed description together with the accompanying drawings wherein:

DESCRIPTION OF THE EXEMPLARY EMBODIMENTS

Embodiments are Exemplary

Figure 1:
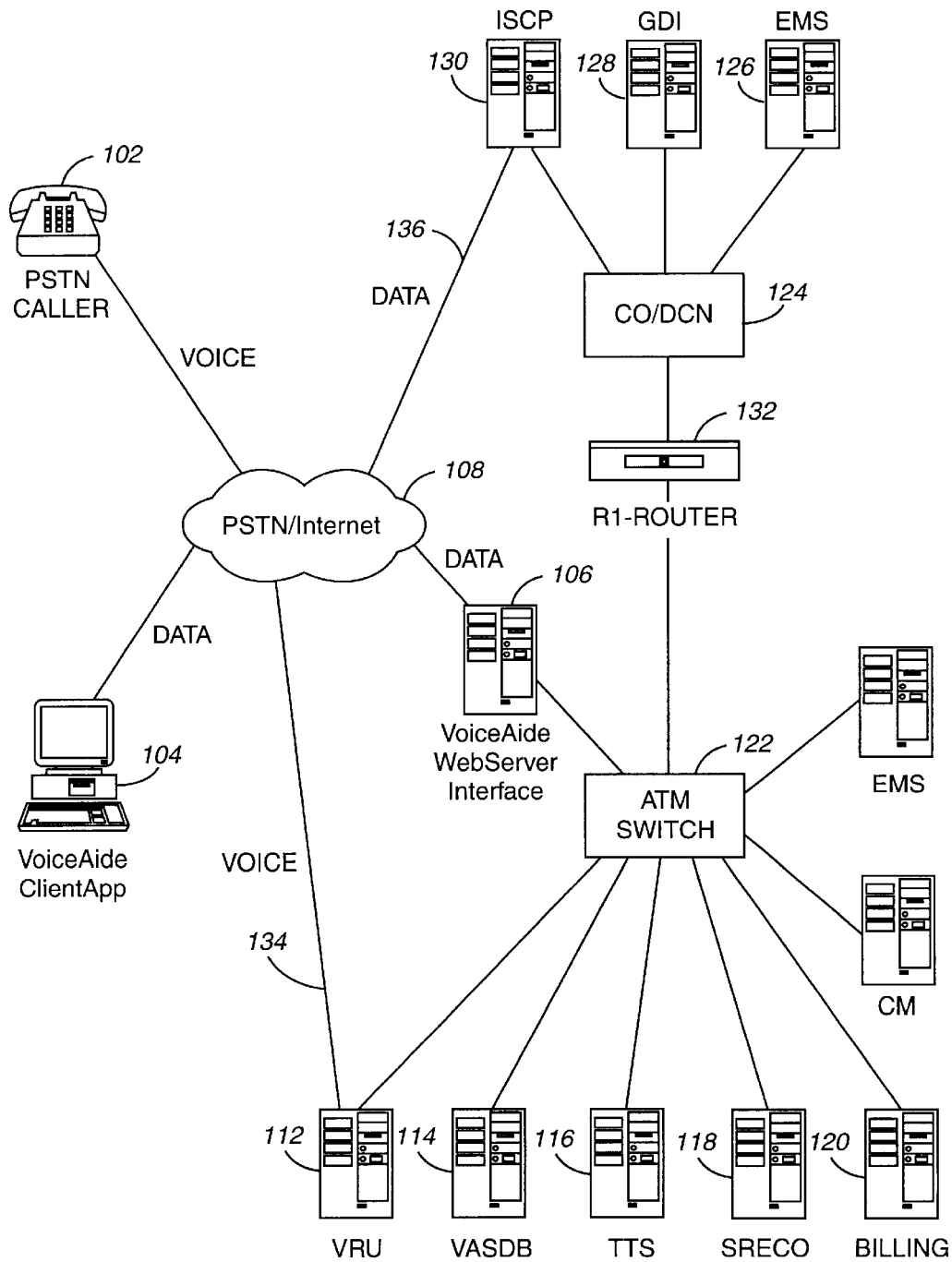
FIG. 1 illustrates an architectural diagram, of a PSTN network with an AIN system and Central office, for carrying out the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiments, wherein these innovative teachings are advantageously applied to the particular problems of Systems And Methods For Assisting Speech And Hearing-Impaired Subscribers Using The Telephone And Central Office. However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Exemplary Method

An exemplary general present invention method may best be understood by referencing the system diagrams of FIG. 1 and the exemplary flowcharts of FIGS. 2–6. These diagrams will now be discussed in detail.

One skilled in the art will recognize that these steps may be rearranged and/or augmented with no loss of generality in the teachings of the present invention.

The teachings of the present invention are sufficiently broad to not limit the manner in which the above mentioned steps are to be performed as well as not limiting the method to any particular hardware, operating system, API, or graphical user interface. Thus, while the particular information gathered within the context of FIGS. 1–6 and the specific function calls listed in the exemplary flowcharts are preferred for some embodiments, they are by no means Limitive of the present invention teachings or the scope thereof.

Exemplary System Architecture

One example where the present invention can be reduced to practice is using on the IBM AIX Multi-Services Platform (MSP) comprising a Call Manager (CM), a VoiceAide WebServer Interface, a VoiceAide Subscriber Database (VASDB), a Text-To-Speech Server (TTS), a Voice Response Unit (DT6 VRU), a QuickPay Subscriber-Client Interface Application (VA-ClientApp) and a Speech Recognition Server (SRECO).

FIG. 1 is an architectural block diagram of a PSTN network with an AIN system and central office for carrying out the present invention. A PSTN (Public Switched Telephone Network) subscriber using handset telephone 102 is connected through the PSTN network 108 to a user using a data processing system 104 running an application such as a Web browser for accessing data on the Web server 106 over the PSTN network 108. An integrated service control point (ISCP) 130, has a data connection 136 to the PSTN network 108. With the AIN (Advanced Intelligent Network) connected to the central office (CO) and data communications network (DCN). The AIN system is well known and is an architecture that separates service logic from switching equipment, allowing new services to be added without having to redesign switches to support new services. It encourages competition among service providers since it makes it easier for a provider to add services and it offers customers more service choices. The AIN system was first developed by Bell Communications Research, AIN is recognized as an industry standard in North America. The ISCP 130 along with the generic data interface (GDI) 128 and element management system (EMS) 126 and the AIN system provides services to subscribers such as call forwarding, three-way calling, find me and other services.

The Web server 106 can be an IBM PC or any other data processor having similar or better capabilities. The customer at the telephone 102 is referred to as a PSTN party, or, a non-impaired party, or, alternatively, a second party, or, a destination party. The customer at the data processing system 104 is referred to as an impaired party or a first party.

The Text-To-Speech Servers (TTS) 116 are used to convert text, from a Client Application 104, to speech and to play to a PSTN party 102. The TTS Servers are connected via a Local Area Network (LAN). The TTS servers 116 are accessed via a DirectTalk/6000 TTS Custom Server, available from IBM Corporation that also interfaces with the (Voice Aide) Web Server 106. A messaging interface is established between the Web Server 106 and the TTS Custom Server to carry requests, to convert text, received from the VA subscriber 104 to the appropriate TTS server resource 116.

The Speech Recognition Servers (SRECO) 118 are used to recognize words spoken by the PSTN party. The recognized spoken words are returned as text from SRECO Servers 118 and are sent to a Client Application 104 to display to an impaired party at 104. The SRECO Servers 118 are connected via a LAN using ATM switch 122. The servers are accessed via a DirectTalk/6000 Custom Server that also interfaces with a VACall State Table and TTS Server 116.

A Voice Response Unit allows prerecorded menus of information to be played to a subscriber 102 or 104 and have selections made with voice or touch tone keypad input (i.e., DTMF—dual tone multiple frequency). The Voice Response Unit 112 is connected between the ATM switch 122 and the PSTN 108 to match voice output from the TTS 116 such as 8 k Mulaw output which is compatible with the PSTN network 198.

A Subscriber Database (VASDB) 114 is used to hold subscriber authentication information to ensure that only authorized subscribers are allowed to use the service. Further, the VASDB 114 is used to store VA subscriber TTS and SRECO customization attribute values for TTS 116 and SRECO 118 resources. All units interface to one another via an Intranet or Internet 110 and messaging between the units is TCP/IP based.

It should be understood that although these are shown as separate system, i.e., Web Server 106, Voice Response Unit 112, Subscriber Database 114, TTS 116, SRECO 118 and Billing 120, any or all of these components may be combined into a single system such as the IBM MSP/600 system.

Registration and Authentication

Upon registering for a new service via the local Central Office (CO) 124, a subscriber can allocate and use CO TTS 116 and SRECO 118 resources to communicate with a non-impaired party 102.

First, a subscriber registers for VoiceAide service. At this stage, an entry, corresponding to the particular subscriber 104, is added to the VASDB 114. The entry contains the subscriber's registration information and default TTS customization attribute values. Subscriber registration information contains the subscriber's account number and pin code. The account number and pin code provide secured access to the subscriber's account and act as a pointer to TTS customization information in the VASDB 114.

Figure 2:
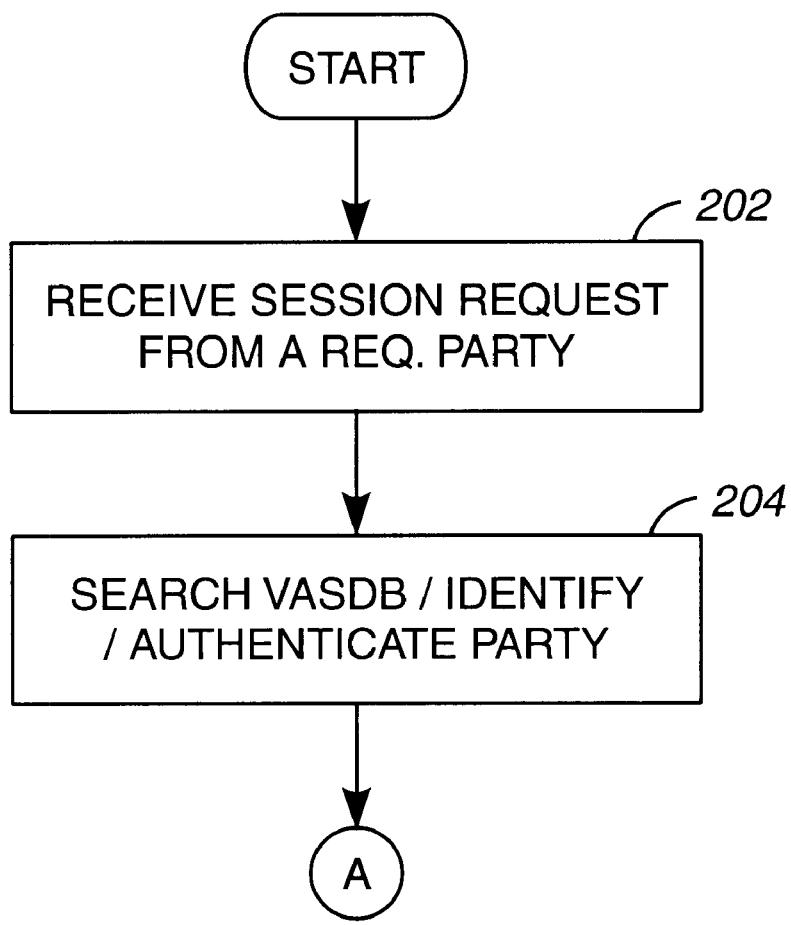
FIG. 2 is a flow diagram of, the beginning of a communication session, and, authentication of parties (an impaired and a PSTN party), according to the present invention.
Figure 3:
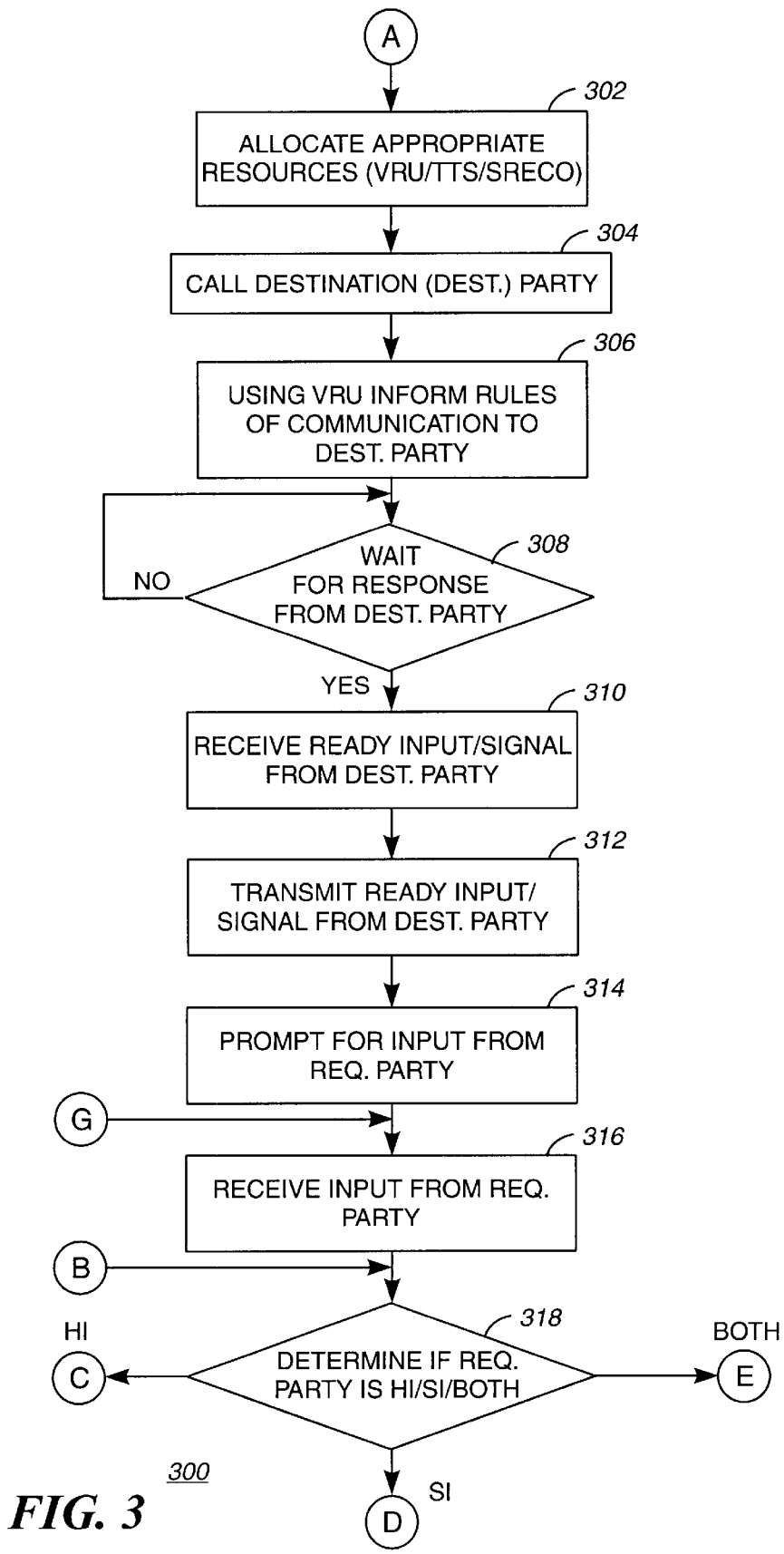
FIG. 3 is a flow diagram of, allocation of appropriate resources, ending with a determination of a party's status, according to the present invention.
Figure 4:
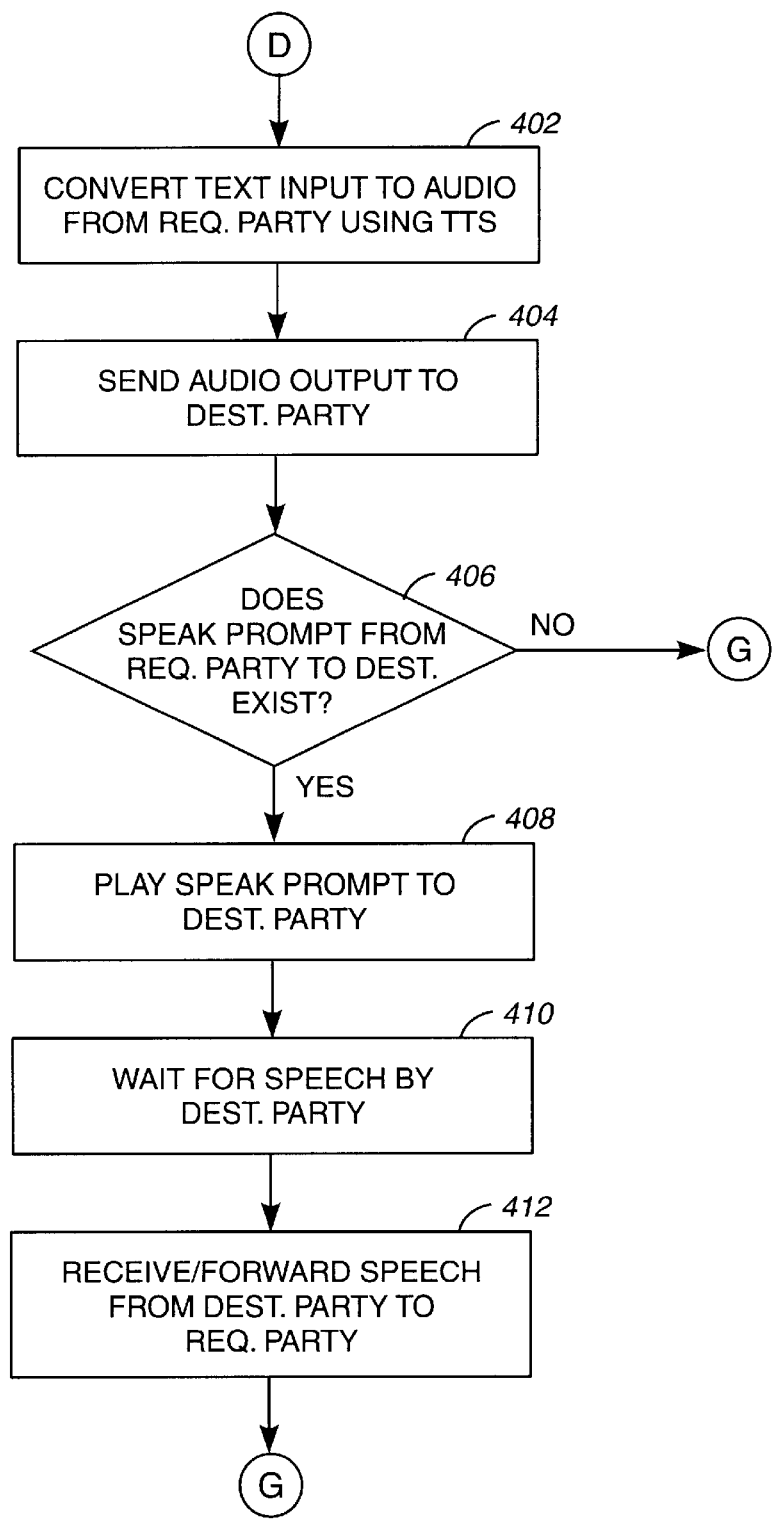
FIG. 4 is a flow diagram of the communications session between a SI and a non-impaired party, according to the present invention.
Figure 5:
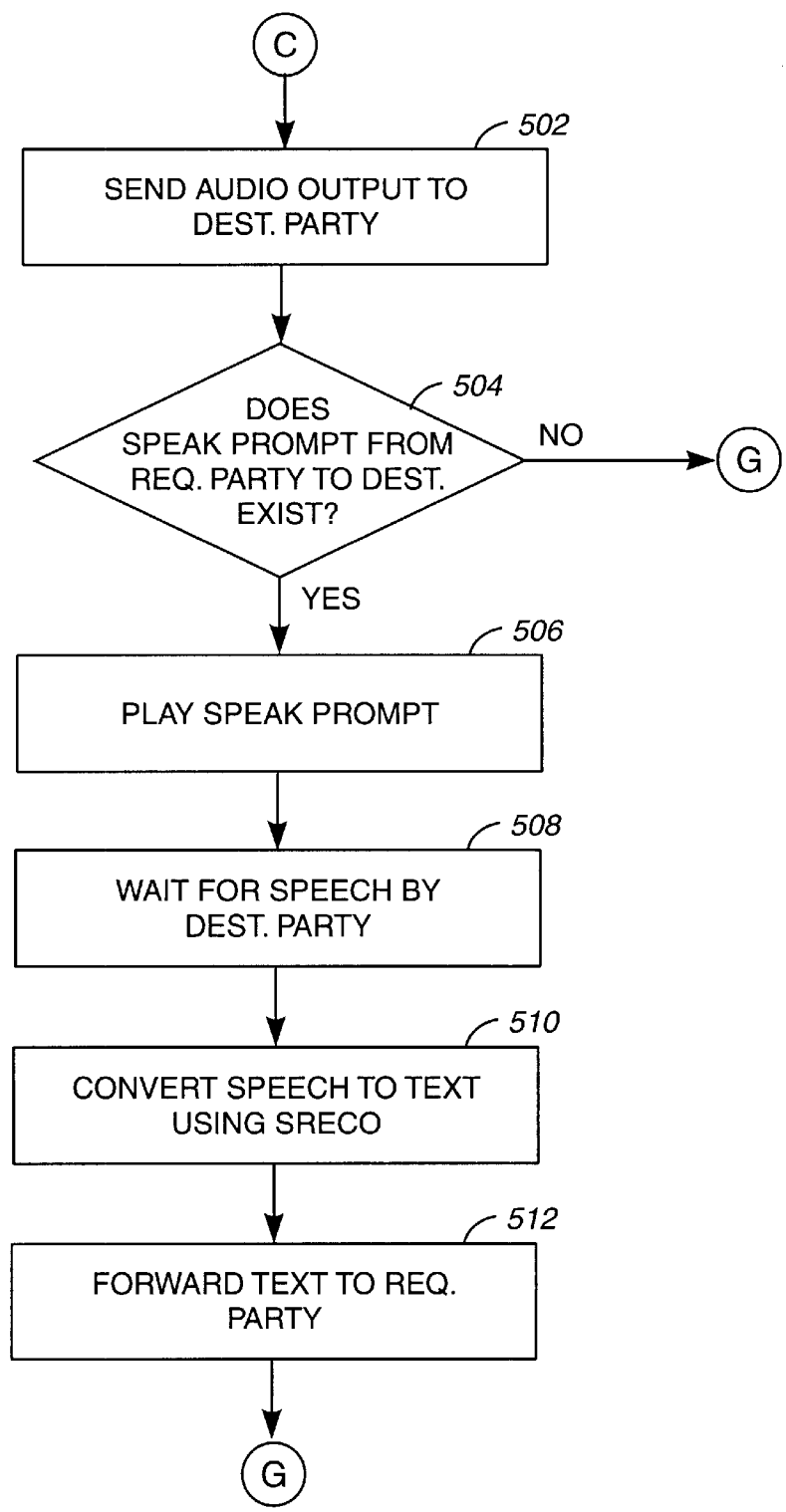
FIG. 5 is a flow diagram of, the communications session between a Hearing-Impaired (HI) party and a non-impaired party, according to the present invention.
Figure 6:
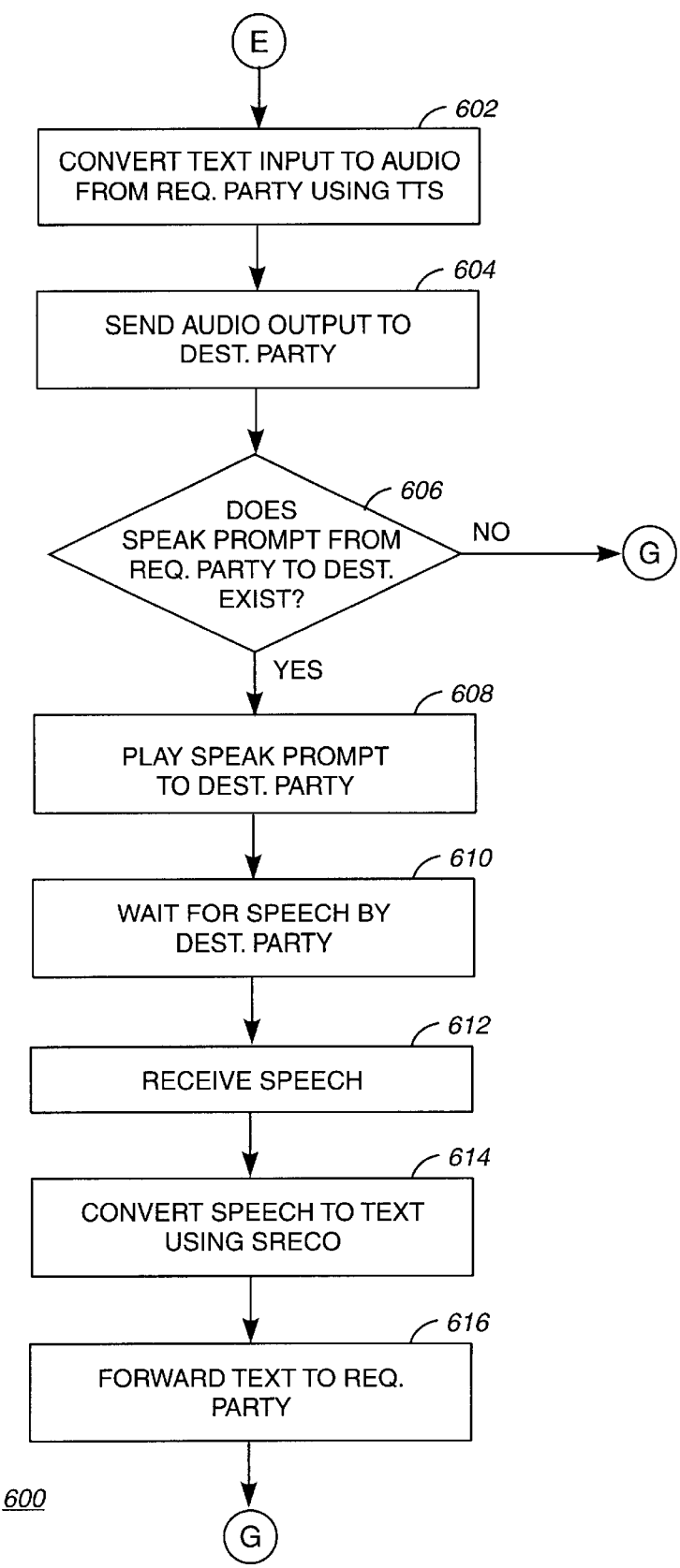
FIG. 6 is a flow diagram of, the communications session between a party that is both Speech Impaired (SI) and Hearing-Impaired (HI), and a non-impaired party, according to the present invention.

Referring now to FIG. 2 and FIG. 1, when a subscriber 104 or a PSTN party 102 wants to communicate (at step 202) with one another, the Web Server Interface 110 requests authentication of the subscriber. Next, the subscriber inputs the subscriber's account number and pin code via the Client App 104. The account number is used to search (at step 204) the VASDB 114 for the subscriber's registration information. Verification of the pin code and account number is performed at VASDB 114. If the successful, the service proceeds to next stage. If the Verification is not successful, the service re-prompts the subscriber for verification, or routes the customer to a help desk (not shown).

Next, the VoiceAide (VA) service notifies the subscriber of the results of authentication and asynchronously initiates an outbound call (at step 304) to the destination party, or notifies the subscriber of an incoming call from the PSTN party. When the PSTN party 102 answers, a prompt is played indicating the call received is from a Central Office VoiceAide Server 110 for the impaired subscriber 104. The name of the subscriber is played to the PSTN party along with rules (at step 306) for the Voice Aide call. Next, the PSTN party 102 is asked to hold while notification of call establishment is sent to the subscriber 104 (at steps 310 and 312). After call establishment notification is received, the subscriber 104 gains control of the communication of conversation. Here, the conversation control is transferred between the PSTN party and the subscriber until the call is terminated. The subscriber 104 is prompted for Input at step 314. When the subscriber inputs information at 104, it is received by the VA service, more specifically by the Web Server 110, at step 316. Next, the VA service determines (at step 318) whether the subscriber is Hearing-Impaired, Speech Impaired or both Speech and Hearing-Impaired. Correspondingly, the events described below follow according to the determination.

Speech Impaired Subscriber (Si)

In the case of a speech impaired subscriber, the Subscriber 104 types a message which is forwarded (at step 316) to the Web Server Interface 110, which in turn uses the allocated Text-to-Speech resource 116 to convert (at step 402) the subscriber's typed text to audio output. The audio output (at step 404) is sent and played to the PSTN destination party 102. The Speech Impaired subscriber 104 has the option (at step 406) of indicating whether a response to the first message is permitted from the PSTN destination party 102, prior to receiving a second message from the Speech Impaired subscriber 104. If the response option is not selected, the PSTN destination party 102 is not permitted to speak. If the response option is selected, the PSTN destination party 102 is provided a speak-prompt (at step 408), after the subscriber's first message is sent and played. The speak-prompt indicates that the Speech-Recognition resource, SRECO 118, is active and will recognize spoken words and transmit text information to the Impaired Subscriber 104. The Voice Aid Service waits (at step 410) for speech by the PSTN destination party 102. Next, the Voice Aid Service receives and forwards (at step 412) the speech from the PSTN destination party 102 to the Impaired Subscriber 104. The communication continues in this manner (in other words repeats 316) until the conversation terminates. If the PSTN destination party 102 terminates, the Impaired party 104 is notified that the PSTN destination party 102 has terminated. If the Speech Impaired party 104 terminates, the PSTN destination party 102 is played a special prompt to notify that the Speech Impaired party 104 has terminated the call.

Speech and Hearing Impaired Subscriber (Both)

In the case of a subscriber that is both speech and Hearing impaired, the impaired subscriber 104 types a message which is forwarded (at step 316) to the Web Server Interface 110, which in turn uses the allocated Text-to-Speech resource 116 to convert (at step 602) the subscriber's typed text to audio output. The audio output (at step 604) is sent and played to the PSTN destination party 102. The Speech and Hearing Impaired subscriber 104 has the option (at step 606) of indicating whether a response to the first message is permitted from the PSTN destination party 102, prior to receiving a second message from the Speech and Hearing Impaired subscriber 104. If the response option is not selected, the PSTN destination party 102 is not permitted to speak. If the response option is selected, the PSTN destination party 102 is provided a speak-prompt (at step 608) after the subscriber's first message is sent and played. The speak-prompt indicates the Speech-Recognition resource, SRECO 118, is active, can recognize spoken words, and will convert the spoken words to text, and transmit text information to the Impaired Subscriber 104. The Voice Aid Service waits (at step 610) for speech by the PSTN destination party 102. Next, the Voice Aid Service receives (at step 612) the speech from the PSTN destination party 102, and converts the speech (at step 614) to text using SRECO 118. Next, the Voice Aid Service forwards (at step 616) the text to the Speech and Hearing Impaired Subscriber. The communication continues in this manner (in other words repeats 316) until the conversation terminates. If the PSTN destination party 102 terminates, the Speech and Hearing Impaired party 104 is notified that the PSTN destination party 102 has terminated the communication. If the Speech and Hearing Impaired party 104 terminates, the PSTN destination party 102 is played a special prompt to notify that the Speech and Hearing Impaired party 104 has terminated the communication session.

Hearing Impaired Subscriber (Hi)

In the case of a Hearing-impaired subscriber, the Subscriber 104 speaks (inputs) a message which is forwarded (at step 316) to the Web Server Interface 110, which in turn sends the audio output message (at step 502) is sent and played to the PSTN destination party 102. The Hearing Impaired subscriber 104 has the option (at step 504) of indicating whether a response to the first message is permitted from the PSTN destination party 102, prior to receiving second message from the Hearing Impaired subscriber 104. If the response option is not selected, the PSTN destination party 102 is not permitted to speak. If the response option is selected, the PSTN destination party 102 is provided a speak-prompt (at step 506) after the subscriber's first message is sent and played. The speak-prompt indicates that the Speech-Recognition resource, SRECO 118, is active, can recognize spoken words, and will convert the spoken words to text, and transmit text information to the Hearing-Impaired Subscriber 104. The Voice Aid Service waits (at step 508) for speech by the PSTN destination party 102. Next, the Voice Aid Service receives and converts (at step 510) the speech, from the PSTN destination party 102, to text using SRECO 118. Next, the Voice Aid Service forwards (at step 512) the text to the Hearing Impaired Subscriber. The communication continues in this manner (in other words repeats 316) until the conversation terminates. If the PSTN destination party 102 terminates, the Hearing Impaired party 104 is notified that the PSTN destination party 102 has terminated the communication. If the Hearing Impaired party 104 terminates, the PSTN destination party 102 is played a special prompt to notify that the Hearing Impaired party 104 has terminated the communication session.

In the present invention, TTS and SRECO conversion and playback are performed in real-time. Further customization of a TTS resource is provided to permit a subscriber to present a consistent voice interface to regularly called PSTN parties.

Two Modes: Initiation and Reception of the Call by Subscriber

VoiceAide can operate in two modes, specifically, initiation mode and receive mode. In the Initiation mode, a registered subscriber 104 initiates an outbound call via VoiceAide; In the Receive mode, VoiceAide notifies a registered subscriber 104 at the Internet connected terminal of an incoming call. Once a call is established at the VRU 112, the VoiceAide service is run. Prompts are played to the PSTN connected party 102 notifying the party that a Central Office VoiceAide Server 126 is facilitating the call. The PSTN party 102 is informed that TTS 116 and SRECO 118 will be used in the call and that the PSTN party 102 will be played tones or queues instructing as to when to speak and listen.

Initiation by Subscriber

To initiate a call from an Internet connected Client App 104, a subscriber inputs an account number, a pin code, and the telephone number of the destination party 102. If authentication of the account number and pin code is successful (at step 204), a message is sent to the Client App 104 indicating to the subscriber that the call is in progress. Once the call is connected, the PSTN connected party 102 is notified (at step 306) by the VRU 112 that the call is from an VoiceAide subscriber 104 and that a CO VoiceAide Server 110 will facilitate the session. The PSTN party 102 is informed of the session rules and is asked to hold while call establishment notification is sent (at step 312) to the VoiceAide subscriber 104.

Once the VoiceAide subscriber receives call establishment notification, the subscriber is presented with a screen (at step 314) to input text. Upon typing text, the subscriber presses a button on a VA-ClientApp menu to send the typed text to the VoiceAide Server 110. The text received at the server 110 is converted to speech and spoken to the PSTN connected party 102. Once the converted text is spoken, a prompt or queue is played to the PSTN party 102 requesting a response. If there is no response, a message is sent to the VA-ClientApp informing the VA subscriber 104 to type and send the next message. Communication continues in this manner until the PSTN party 102 hangs up or until the VA subscriber 104 presses the hang-up button on the VA-ClientApp menu.

Reception of the Call by Subscriber

To receive a VoiceAide call, the VA subscriber accesses a VA-ClientApp from a Central Office WebPage and downloads it to the terminal 104. The active VA-ClientApp waits for an incoming call notification request from the VoiceAide Server 110. The subscriber may also choose to terminate the wait and initiate an outbound call, instead.

The subscriber 104 receives an incoming call notification in the form of a pop-up menu. The pop-up menu contains Caller ID information also. The subscriber answers the incoming call by pressing the answer button on the VA-ClientApp menu. Next, the subscriber is asked to provide a VoiceAide account number and pin code for authentication. If authentication is successful, the call continues in the manner as if the VA subscriber 104 had initiated the call.

Customization

In both of the aforementioned modes, the subscriber can customize a TTS resource. To customize a TTS resource, the subscriber presses a customize button on the VA-ClientApp menu. The next menu requires the subscriber to enter a VA account number and pin code. If authentication is successful, the subscriber is shown a menu of TTS voice attributes. The subscriber can modify values in the voice attribute fields and also can test the modifications by pressing a play button on the TTS customization menu. This causes a sample phrase to be converted to speech using the new attribute values and downloaded to the subscriber's terminal 104.

After completing TTS voice customization, a subscriber 104 can save customization values in the VASDB 114 with their associated authentication information. When a VA call is initiated or received, the saved values will be used in the TTS conversion process.

In the present invention, the VoiceAide VRU 112 can be directly connected to the Public Switch Telephone Network (PSTN) 106 or can be connected to an intermediate switch 120 that is connected to the PSTN 106. Further, the VoiceAide service can be written in any language, the VRU programming interface can support, or the service platform on which it resides.

Termination

When the VA subscriber 104 or the PSTN party 102 terminates the VA call, resources associated with the call are freed. In one embodiment, to terminate, the VA subscriber 104 selects a hang-up button from the VA-ClientApp menu. Next, the PSTN party 102 is played a prompt. This prompt alerts the PSTN party 102 that the call is terminating and to hang-up the telephone.

If the PSTN party 102 terminates first, a text pop-up message will be presented, by the VA-ClientApp, to alert the VA subscriber 104 that the PSTN party 102 has terminated the call. In response, the VA subscriber 104 selects a close button on the pop-up menu. This action frees the CO resources associated with the call. Then, the VA-ClientApp waits for the next incoming call.

Although a specific embodiment of the invention has been disclosed, those having skill in the art will understand that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for communications in a network that includes a Central Office and an Advance Intelligent Network system, wherein the Central Office is coupled to a plurality of user units, the method on the Advance Intelligent Network system comprising the steps of:

receiving a communication session request from a first party using a first user unit; and determining if the first party is speech-impaired, and if the first party is speech impaired, then performing the sub-steps of:

prompting the first party for text input includes providing a screen menu and interface, over an Internet protocol, for typing thereinto by the first party and providing an option for the first party to indicate if, a response by the second party, to a first message sent by the first party is permitted, prior to receiving a second message from the first party;

receiving the text input from the first party; and converting the text input, using a Text-to-Speech resource, to an audio output; and sending the audio output to a second party.

2. The method of claim 1, wherein the sub-step of sending the audio output to a second party further includes the sub-steps of:

providing the second party a prompt to verbally respond after audio output is sent to the second party;

forwarding a verbal response received to the first party;

sending the verbal response to the first party; and receiving the verbal response from the second party.

3. The method of claim 2, wherein the sub-step of sending the verbal response to the first party further includes, determining if the first party is hearing-impaired, and if the first party is hearing-impaired, then, performing the conversion of the verbal response to text, using a Speech Recognition resource, and sending the text output to the first party.

4. The method of claim 1, wherein the sub-step of sending the audio output to a second party further includes the sub-steps of:

providing the second party a prompt to verbally respond after audio output is sent to the second party;

forwarding a verbal response received to the first party;

sending the verbal response to the first party; and receiving the verbal response from the second party; and determining if the first party is hearing-impaired, and if the first party is hearing-impaired, then, performing the conversion of the verbal response to text, using a Speech Recognition resource, and sending the text output to the first party.

5. The method of claim 1, wherein the sub-step of converting the text input to audio output further includes receiving the text input over an Internet protocol.

6. The method of claim 1, wherein the step of determining if the first party is speech-impaired further includes the sub-steps of:

receiving an identifier from the first party; and comparing the identifier received with a pre-stored list of speech-impaired parties.

7. The method of claim 1, wherein the sub-step of authenticating the first party further includes the sub-steps of:

receiving a value for authentication from the first party; and comparing the value received with a pre-stored list of values for the first parties.

8. A method for communications in a network that includes a Central Office and an Advance Intelligent Network system, wherein the Central Office is coupled to a plurality of user units, the method on the Advance Intelligent Network system comprising the steps of:

receiving a communication session request from at least one party to at least a non-impaired party; and determining if at least one party is speech-impaired, and if at least one party is a speech-impaired party, then performing the sub-steps of:

prompting the speech-impaired party for text input includes providing a screen menu and interface, over an Internet protocol, for typing thereinto by the speech-impaired party and providing an option for the speech-impaired party to indicate if, a response by the non-impaired party, to a first message sent by the speech-impaired party is permitted, prior to receiving a second message from the speech-impaired party;

receiving the text input from the speech-impaired party;

converting the text input to voice output; and sending the voice output to a non-impaired party.

9. The method of claim 8, wherein the sub-step of sending the audio output to a non-impaired party further includes the sub-steps of:

providing the non-impaired party a prompt to verbally respond after audio output is sent to the non-impaired party;

forwarding a verbal response received to the speech-impaired party;

sending the verbal response to the speech-impaired party; and receiving the verbal response from the non-impaired party.

10. The method of claim 9, wherein the sub-step of sending the verbal response to the speech-impaired party further includes, determining if the speech-impaired party is hearing-impaired, and if the speech-impaired party is hearing-impaired, then, performing the conversion of the verbal response to text, using a Speech Recognition resource, and sending the text output to the speech-impaired party.

11. The method of claim 8, wherein the sub-step of sending the audio output to a non-impaired party further includes the sub-steps of:

providing the non-impaired party a prompt to verbally respond after audio output is sent to the non-impaired party;

forwarding a verbal response received to the first party;

sending the verbal response to the speech-impaired party; and receiving the verbal response from the non-impaired party; and determining if the speech-impaired party is hearing-impaired, and if the speech-impaired party is hearing-impaired, then, performing the conversion of the verbal response to text, using a Speech Recognition resource, and sending the text output to the speech-impaired party.

12. The method of claim 8, wherein the substep of converting the text input to audio output further includes receiving the text input over an Internet protocol.

13. The method of claim 8, wherein the step of determining if the speech-impaired party is speech-impaired further includes the sub-steps of:

receiving an identifier from the speech-impaired party; and comparing the identifier received with a pre-stored list of speech-impaired parties.

14. The method of claim 8, wherein the sub-step of authenticating the speech-impaired party further includes the sub-steps of:

receiving a value for authentication from the speech-impaired party; and comparing the value received with a pre-stored list of values for the speech-impaired parties.

15. A computer readable medium containing programming instructions for communications in a network that includes a Central Office and an Advance Intelligent Network system, wherein the Central Office is coupled to a plurality of user units, the method on the Advance Intelligent Network system, the programming instructions comprising:

receiving a communication session request from a first party using a first user unit; and determining if the first party is speech-impaired, and if the first party is speech-impaired, then performing the sub-steps of:

prompting the first party for text input includes providing a screen menu and interface, over an Internet protocol, for typing thereinto by the first party and providing an option for the first party to indicate if, a response by the second party, to a first message sent by the first party is permitted, prior to receiving a second message from the first party;

receiving the text input from the first party; and converting the text input, using a Text-to-Speech resource, to an audio output; and sending the audio output to a second party.

16. A computer readable medium containing programming instructions for communications in a network that includes a Central Office and an Advance Intelligent Network system, wherein the Central Office is coupled to a plurality of user units, the method on the Advance Intelligent Network system, the programming instructions comprising:

receiving a communication session request from at least one party to at least a non-impaired party; and determining if at least one party is speech-impaired, and if at least one party is a speech-impaired party, then performing the sub-steps of:

prompting the speech-impaired party for text input includes providing a screen menu and interface, over an Internet protocol, for typing thereinto by the speech-impaired party and providing an option for the speech-impaired party to indicate if, a response by the non-impaired party, to a first message sent by the speech-impaired party is permitted, prior to receiving a second message from the speech-impaired party;

receiving the text input from the speech-impaired party;

converting the text input to voice output; and sending the voice output to a non-impaired party.

17. An Advance Intelligent Network system for communicating a network that includes a Central Office, wherein the Central Office is coupled to a plurality of user units, the Advanced Intelligent Network system comprising:

means for receiving a communication session request from a first party using a first user unit; and determining if the first party is speech-impaired, and if the first party is speech-impaired, then performing the sub-steps of:

means for prompting the first party for text input includes providing a screen menu and interface, over an Internet protocol, for typing thereinto by the first party and providing an option for the first party to indicate if, a response by the second party, to a first message sent by the first party is permitted, prior to receiving a second message from the first party;

means for receiving the text input from the first party;

means for converting the text input, using a Text-to-Speech resource, to an audio output; and means for sending the audio output to a second party.

18. An Advance Intelligent Network system for communicating a network that includes a Central Office, wherein the Central Office is coupled to a plurality of user units, the Advanced Intelligent Network system comprising:

means for receiving a communication session request from at least one party to at least a non-impaired party; and means for determining if at least one party is speech-impaired, and if at least one party is a speech-impaired party, then performing means for prompting the speech-impaired party for text input includes providing a screen menu and interface, over an Internet protocol, for typing thereinto by the speech-impaired party and providing an option for the speech-impaired party to indicate if, a response by the non-impaired party, to a first message sent by the speech-impaired party is permitted, prior to receiving a second message from the speech-impaired party;

means receiving the text input from the speech-impaired party;

means for converting the text input to voice output; and sending the voice output to a non-impaired party.

* * * * *